UNITED STATES PATENT OFFICE.

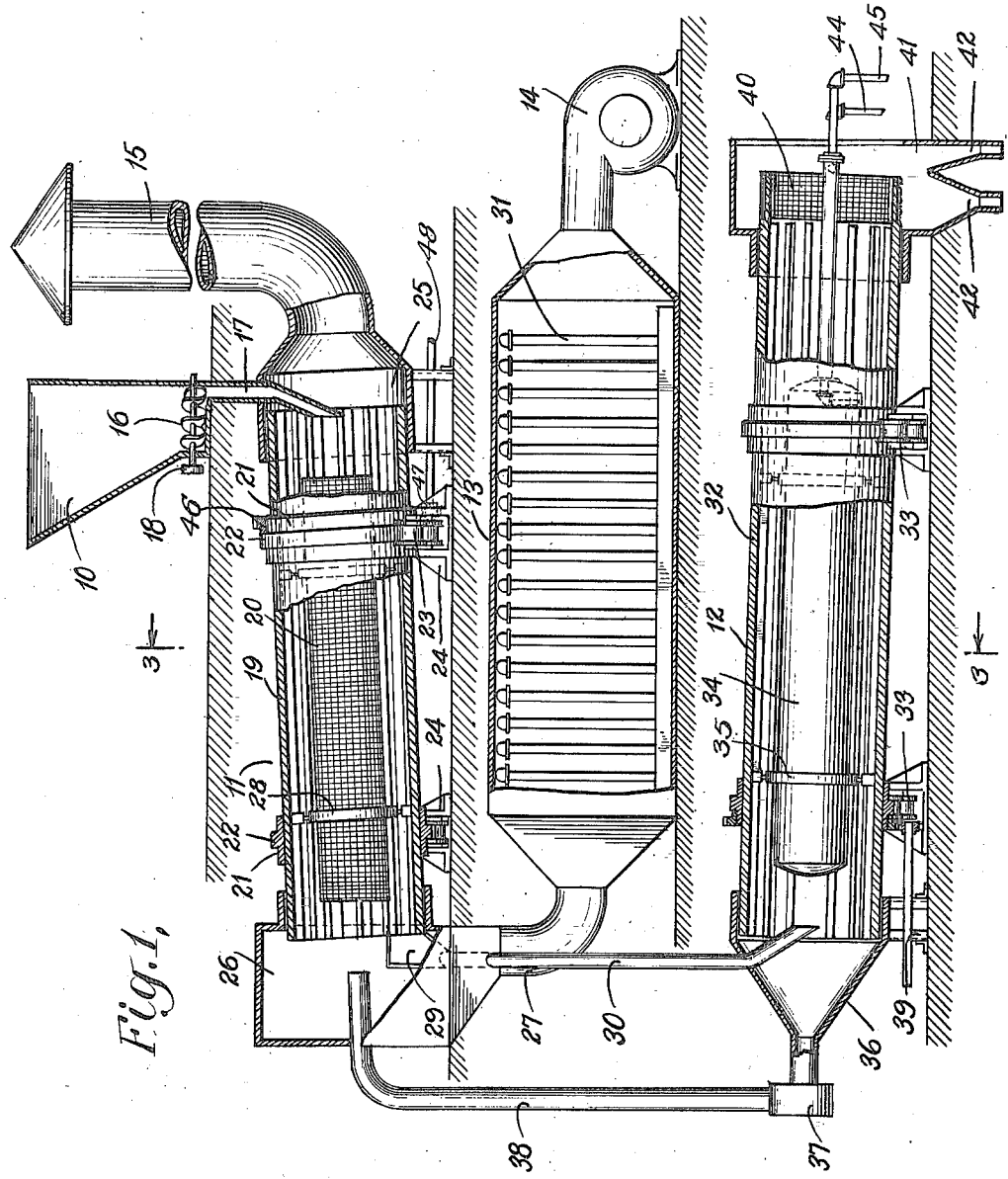

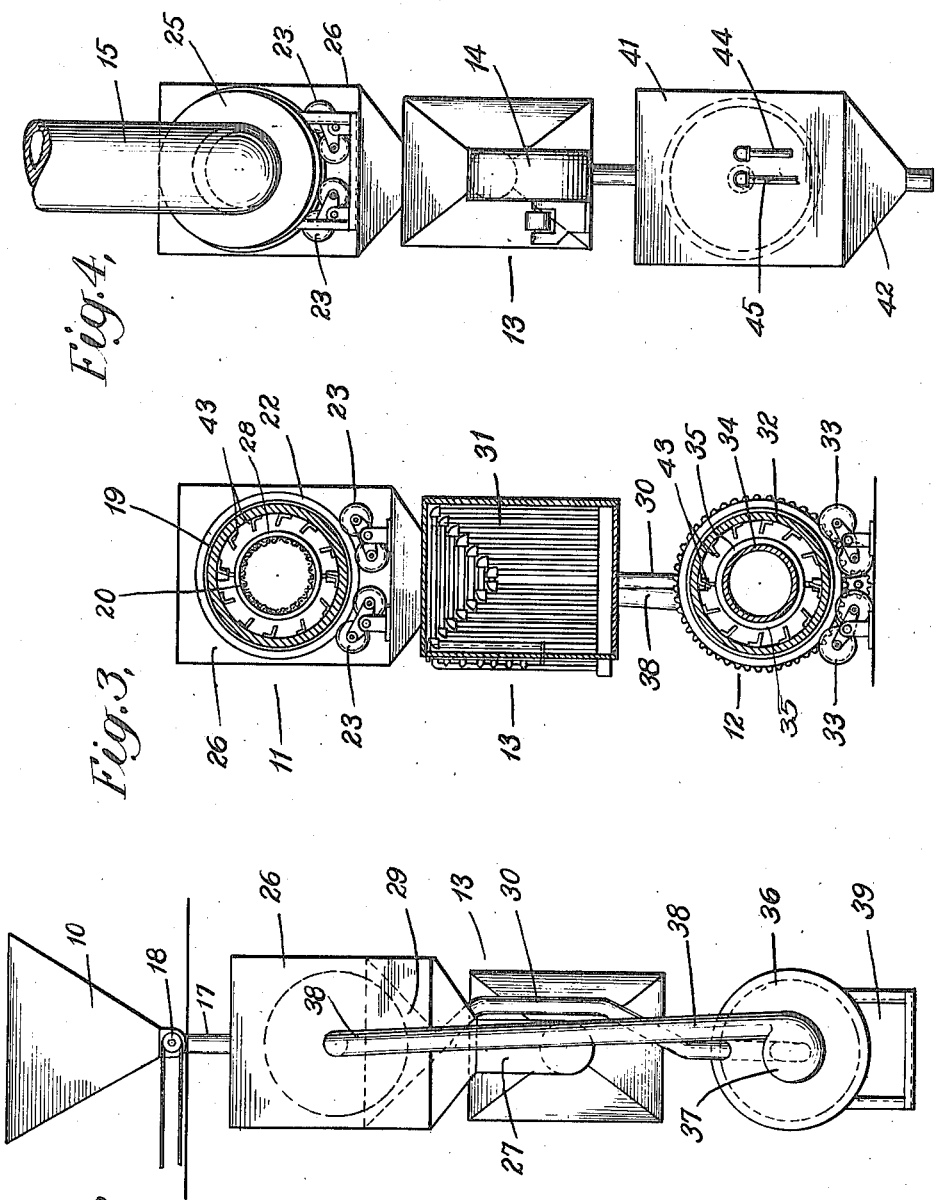

GODFREY ENGEL, OF BROOKLYN, NEW YORK.

APPARATUS FOR GRANULATING AND DRYING SUGAR.

1,216,555. Specification of Letters Patent. Patented Feb. 20, 1917.

Application filed November 10, 1915. Serial No. 60,648.

*To all whom it may concern:*

Be it known that I, GODFREY ENGEL, a citizen of the United States of America, and a resident of Brooklyn, Kings county, and State of New York, have invented certain new and useful Improvements in Apparatus for Granulating and Drying Sugar, of which the following is a specification, reference being had to the accompanying drawings, forming a part thereof.

My invention relates to an apparatus for granulating and drying sugar and has special reference to such as comprises one or more revolving drums and utilizes a blast of drying air.

One object of my invention is to provide an economical and efficient apparatus of the character above indicated that shall make use of a relatively large volume of drying air, and shall avoid the losses usually sustained by large quantities of small particles of marketable sugar being carried away with drying air.

Another object of my invention is to increase the efficiency and improve the quality of the finished product by providing an apparatus that will break up the lumps into separate crystals and disseminate the sugar uniformly throughout the entire drum without at any time permitting it to fall a sufficiently great distance to damage the crystals.

Another object is to provide a sugar granulating and drying apparatus that shall have a larger capacity relative to the size of its rotatable cylinders and to the space which it occupies by doing away with at least one of the steam drums which have hitherto been employed and have obstructed a large proportion of the cross-sectional area of each cylinder, and utilizing an open-ended cylindrical wire disseminating screen, which leaves practically the entire cross-sectional area available for large volumes of preheated air to pass through for granulating and drying the sugar. By this means the space underneath the steam drum where most of the air naturally tends to pass in the apparatus of the prior art since the sugar falls from the sides of the steam drum and leaves an unobstructed air passage below, is filled with disseminated sugar and is available as a drying space.

Other objects and advantages of my invention will be set forth hereinafter and in order that my invention may be thoroughly understood, I will proceed to describe the same in the following specification and then point out the novel features thereof in appended claims.

Referring to the drawings:

Figure 1 is a partially sectional elevation of a granulating and drying apparatus arranged and constructed in accordance with my invention.

An end elevation of the same apparatus is shown in Fig. 2.

Fig. 3 is a transverse sectional view taken on the line 3—3 of Fig. 1.

Fig. 4 is an elevation of the same apparatus looking at the opposite end from that of Fig. 2.

The apparatus illustrated comprises, in general, a wet sugar bin 10, an upper granulator 11, a lower granulator 12, a heater 13, a fan or blower 14, a fan or blower 37 and a stack 15.

The wet sugar bin is made in the form of a hopper and is provided with a screw convever 16 or some other suitable means for continuously delivering the wet sugar through a spout 17 to one end of the upper granulator 11. The screw conveyer is provided, as shown, with a driving pulley 18, although it may be driven in any suitable manner.

The upper granulator 11 comprises a hollow cylinder or drum 19, which is long relative to its diameter, and a concentric inner disseminating cylinder 20, made of wire screen, which is fastened to the inside of the outer drum by arms 28. When arranged as shown, the common axis of the cylinders 19 and 20 is slightly inclined to the horizontal, the receiving end into which sugar is discharged from the spout 17, being higher than the outlet end.

Any suitable means may be employed for rotating the cylinder 19. In the arrangement illustrated it is provided with rings 21 one of which carries an annular gear 46, meshing with a pinion 47 on a shaft 48, which shaft may be driven by any means desired. Annular rings 22 are supported on spaced rollers 23 and furnish the bearings for the drum.

The upper end of the cylinder 19 fits into a stationary box 25, from which the stack or ventilator 15 extends. The lower end of the cylinder extends into a stationary box 26, which is connected by a pipe 27 to one end of the heater 13.

Within the stationary box 26 and in position to receive the sugar discharged from the cylinder 19, is a hopper 29, which is connected by a pipe 30 to the lower granulator 12.

The heater 13 is interposed between the fan or blower 14 and the pipe 27, and comprises a casing or box in which a coil of steam pipe 31 is disposed.

The arrangement of parts is such that air is delivered from the fan or blower 14 to the heater and after its temperature is raised by the steam coil, it is forced upwardly from the pipe 27 and through the upper granulator 11, as hereinafter explained.

The lower granulator comprises a cylinder or drum 32, which is similar to the cylinder 19 and is similarly supported and driven. Within the cylinder 32 is a steam drum 34 which is coaxial with the cylinder 32 and is supported from the inside of same by arms 35, which correspond to the arms 28 of the upper cylinder.

The common axis of the steam drum 34 and the cylinder 32 is inclined to the horizontal but in an opposite direction to the cylinders 19 and 20 if placed as shown, the inclination being such as to feed the sugar toward the discharge end of the cylinder.

A stationary funnel-shaped box 36 is fitted over the intake end of the cylinder 32 and is connected by a fan or blower 37 and a pipe 38 to the box 26. It is mounted on a stationary bracket 39.

The pipe 30 which leads downwardly from the hopper 29 extends into the upper end of the cylinder 32 and is adapted to discharge the sugar received from the upper granulator into the lower granulator. The discharge end of the cylinder 32 is formed of a wire bolting screen 40 and extends into an open box or bin 41 from which the sugar is discharged in dry granular form through one or more spouts 42.

Each of the granulator cylinders 19 and 32 is provided on its inner surface with a plurality of inwardly projecting blades or buckets 43 for the purpose of carrying the sugar upward as the cylinder rotates and dropping it upon the disseminating screen drum 20 or the steam drum 34 as the case may be.

The length of the cylinder in each case, the inclination of its axis, and the speed at which it is rotated are such as to carry the sugar upward and discharge it upon the inner screen or drum a sufficient number of times to secure the result desired, as more fully pointed out hereinafter.

The steam is supplied from any suitable source (not shown) through a pipe 44 to the steam drum 34 and to the coil 31 of the heater, the water of condensation being discharged through a pipe 45.

The operation of the apparatus is as follows:—Assuming that the screw-conveyer 16 is being driven and is continuously delivering wet sugar from the bin or hopper through the spout 17 to the upper granulator drum 19, if the drums 19 and 31 are rotated and the fans or blowers 14 and 37 driven by any suitable motor or motors (not shown), the wet sugar first enters the cylinder 19 at its upper end and is continuously carried upward by the buckets 43 and dropped upon the disseminating screen cylinder 20. The sugar will obviously travel gradually in an axial direction within the cylinder 19 on account of the inclination of the cylinder or of the buckets and as it is repeatedly thrown upon the disseminating screen cylinder 20 it is uniformly distributed in space and disseminated into separate individual crystals or particles of sugar, before reaching the bottom of the cylinder 19. At the same time previously heated air is being forced from the heater 13 by the blower 14 upwardly through the cylinder 19, and through the disseminating wire cylinder 20, which is open at its ends, and is discharged through the ventilator or stack 15. This blast of hot air comes in contact with the sugar in finely divided form as it falls and removes a large part of the moisture, which the sugar contains.

The nearly dry sugar, which is discharged from the cylinder 19, at its lower end, enters the hopper and passes downwardly through the pipe 30, being discharged into the upper end of the lower granulator cylinder 32. This cylinder is rotating and its inwardly projecting blades or buckets 43 carry the sugar upwardly and drop it onto the steam drum 34, which is made of boiler steel so as to be tight under steam pressure and which, in conjunction with the air from blower 37, completes the drying of the sugar as it reaches the lower end of the lower granulator.

The blower 37 produces a draft of air from the open box 41 through the cylinder 32, through the funnel-shaped box 36 to the blower, the air being discharged therefrom through the pipe 38 and into the box 26. The end of the pipe 38 extends into the box 26 in a direction coincident with the axis of the drum 19. This blast of air is therefore mixed with the hot air blast from the pipe 27 and the heater 13 as it passes through the cylinders 19 and 20. The volume of air drawn through the lower cylinder is smaller than that drawn through the upper cylinder since the steam drum 34 restricts the cross-sectional area of the lower cylinder.

Thus the sugar is dried by passing a comparatively large volume of previously heated air through the continuously falling sugar, the direction of the air being opposite to the general movement of the sugar through the granulating cylinder.

By utilizing a wire cylinder with open ends in the upper granulator the entire cross-sectional area of the granulator cylinder is available for transmitting a volume of air which is much greater for a given velocity than could possibly be passed through the cylinder if a steam drum, such as the drum 34, were employed.

Furthermore, by passing a comparatively small volume of cooled air through the drier portion of the falling sugar (that is to say, in the lower granulator), and mingling this air with the heated air as it passes through the wet sugar, the sugar dust or finer sugar particles carried in suspension are intercepted by the moist sugar in the upper granulator and are prevented from being carried away with the air.

Various other arrangements and advantages will suggest themselves to those skilled in this art, and my invention is obviously neither restricted to the specific apparatus shown and described nor for the particular purpose for which it is primarily intended. I therefore intend that only such limitations be imposed as are indicated in the appended claims.

What I claim is:

1. A drying and granulating apparatus comprising a rotatable cylinder, having an inclined axis, a cylindrical screen within the rotatable cylinder, means for supplying material to be dried and granulated to the upper end of the rotatable cylinder, and means for providing a blast of air through the rotatable cylinder from its lower to its upper end.

2. A granulator comprising a rotatable cylinder having means for continuously carrying the material to be treated upward and permitting it to fall within the cylinder, and a screen within the cylinder adapted to break up the material as it falls.

3. A granulator comprising a rotatable cylinder having an inclined axis and having means for carrying the material to be granulated upward and permitting it to fall within the cylinder, and a coaxial cylindrical screen within the rotatable cylinder adapted to break up the material as it falls.

4. A drying and granulating apparatus comprising a rotatable cylinder, having an inclined axis, a wire screen within the rotatable cylinder, means for supplying material to be dried and granulated to the upper end of the rotatable cylinder, and means for providing a blast of warm air through the rotatable cylinder from its lower to its upper end.

5. A drying and granulating apparatus comprising a rotatable cylinder, means for breaking up the moist material to be granulated as it continuously falls within the cylinder, means for forcing warm air through the cylinder, a second granulating means adapted to receive the material as it is discharged from the cylinder, means for forcing a relatively small blast of air through the second granulating means and thence through the cylinder with the warm blast.

6. A drying and granulating apparatus comprising a preliminary apparatus, means for passing a large volume of warm air therethrough, a final apparatus, and means for passing a relatively small volume of cool air therethrough to remove fine particles from the dry product, said cool air being carried through the preliminary apparatus with the warm air to prevent the dry, fine particles from being lost in the final drying air.

7. A drying and granulating apparatus comprising an upper inclined rotatable cylinder, driving means therefor, a cylindrical screen within the cylinder coaxial therewith and affixed thereto, a lower rotatable cylinder, driving means therefor, a steam drum within the lower cylinder, means for supplying material to be dried and granulated to the upper end of the revolving cylinder, and for transferring said material from the lower end of the upper cylinder to the upper end of the lower cylinder, and means for supplying a blast of air through the lower and upper cylinders in succession.

8. A granulator comprising a rotatable cylinder having means for continuously carrying the material to be dried upward and permitting it to fall within the cylinder, and a cylindrical wire screen within the cylinder adapted to break up the material as it falls.

9. A granulator comprising a rotatable cylinder having an inclined axis and having means for carrying the material to be granulated upward and permitting it to fall within the rotatable cylinder and a coaxial cylindrical screen within the cylinder and secured thereto for breaking up the material as it falls.

10. An apparatus for drying and granulating sugar comprising a preliminary apparatus, means for passing a large volume of warm air therethrough, a final apparatus, and means for passing a relatively small volume of cool air therethrough to complete the process, said cool air being carried through the preliminary apparatus with the warm air to prevent dry particles of sugar from being lost in the final process.

11. A drying and granulating apparatus comprising a rotatable cylinder having its axis inclined to the horizontal, inwardly projecting ribs or buckets for carrying the material to be granulated upward within the cylinder, and disseminating means within the cylinder.

12. A drying and granulating apparatus comprising a rotatable cylinder having its axis inclined to the horizontal, inwardly projecting ribs or buckets for carrying the material to be granulated upward within the cylinder, and a coaxial cylindrical wire disseminating screen within the cylinder.

13. A drying and granulating apparatus comprising a rotatable cylinder, inwardly projecting ribs or buckets for carrying the material to be granulated upward within the cylinder, and a coaxial cylindrical wire disseminating screen within the cylinder.

14. A drying and granulating apparatus comprising a cylindrical wire disseminating screen, and means for lifting and dropping the material to be granulated onto the disseminating screen.

15. A drying and granulating apparatus comprising a pair of revolving cylinders through which the material to be granulated is passed in succession, means for forcing the preheated air through one of the cylinders, and means for forcing another body of air through the two cylinders in succession.

16. A drying and granulating apparatus comprising a pair of revolving cylinders through which the material to be granulated is passed in succession, means for forcing the predetermined air through one of the cylinders, and means for forcing another body of air through the two cylinders in succession, the air being passed through the cylinders in the opposite direction to that of the material.

17. A drying and granulating apparatus comprising upper and lower cylinders, means for conducting air successively through the lower and through the upper cylinders and for conducting additional air through the upper cylinder only.

18. A granulating and drying apparatus comprising a rotatable cylinder with a wire disseminating screen affixed therein, a second rotatable cylinder with a steam drum affixed therein and means for transferring material from one to the other of said cylinders.

19. A granulating and drying apparatus comprising a rotatable cylinder with a coaxial cylindrical wire disseminating screen affixed therein, a second rotatable cylinder with a cylindrical steam drum affixed therein and independent means for transferring material, and drying fluid between the cylinders.

20. A drying and granulating apparatus comprising a rotatable cylinder having means for continuously carrying the material to be dried upward and permitting it to fall within the cylinder, and a wire screen within the cylinder adapted to break up the material as it falls.

21. A drying and granulating apparatus comprising an inclined rotatable cylinder, means for supplying material to be dried and granulated thereto, a cylindrical wire disseminating screen within the cylinder, and means for providing a blast of warm air through the rotatable cylinder from its lower to its upper end.

22. A drying and granulating apparatus comprising a rotatable cylinder, means for breaking up the moist material within the cylinder, means for forcing the warm air through the cylinder, a second granulating means adapted to receive the material as it is discharged from the cylinder, and means for forcing a relatively small volume of air through the second granulating means and thence through the cylinder, together with the warm blast.

In witness whereof, I have hereunto set my hand, this 8 day of November, 1915.

GODFREY ENGEL.